US007776957B2

(12) United States Patent
Khvorost et al.

(10) Patent No.: US 7,776,957 B2
(45) Date of Patent: Aug. 17, 2010

(54) AQUEOUS FORMULATIONS CONTAINING POLYAROMATIC COMPOUNDS WITH ACID GROUPS

(75) Inventors: Alexander Khvorost, Laudenbach (DE); Gerhard Eugen Wahsner, Ludwigshafen (DE); Sven Thate, Neuleiningen (DE); Harald Boehnke, Speyer (DE); Dennis Loesch, Altrip (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 221 days.

(21) Appl. No.: 11/994,208

(22) PCT Filed: Jun. 29, 2006

(86) PCT No.: PCT/EP2006/063669

§ 371 (c)(1),
(2), (4) Date: Dec. 28, 2007

(87) PCT Pub. No.: WO2007/003568

PCT Pub. Date: Jan. 11, 2007

(65) Prior Publication Data

US 2008/0214719 A1   Sep. 4, 2008

(30) Foreign Application Priority Data

Jun. 30, 2005   (DE) .................. 10 2005 030 970

(51) Int. Cl.
C08G 73/02   (2006.01)
(52) U.S. Cl. ........................... 524/800; 524/802
(58) Field of Classification Search .................. 524/800, 524/802
See application file for complete search history.

(56) References Cited

U.S. PATENT DOCUMENTS

| 4,268,650 | A | 5/1981 | Rose |
| 6,348,516 | B1 | 2/2002 | Soczka-Guth et al. |
| 2002/0091225 | A1 | 7/2002 | McGrath et al. |
| 2002/0103327 | A1 | 8/2002 | Claub et al. |
| 2004/0131910 | A1 | 7/2004 | Bauer |
| 2004/0149965 | A1 | 8/2004 | Otsuki et al. |
| 2007/0117958 | A1 | 5/2007 | Mohwald et al. |

FOREIGN PATENT DOCUMENTS

| CA | 2 098 238 | | 12/1993 |
| DE | 3321860 | A | 12/1984 |
| DE | 34 02 471 | A | 8/1985 |
| DE | 42 11 266 | A | 10/1993 |
| EP | 0 008 895 | A1 | 3/1980 |
| EP | 0 574 791 | A2 | 12/1993 |
| EP | 0 932 213 | A1 | 7/1999 |
| EP | 1 238 998 | A1 | 9/2002 |
| EP | 0 815 159 | B1 | 6/2003 |
| EP | 1 420 473 | A1 | 5/2004 |
| EP | 1 449 886 | A1 | 8/2004 |
| EP | 1 465 277 | A1 | 10/2004 |
| EP | 1 479 714 | A1 | 11/2004 |
| JP | 2004-345997 | | 12/2004 |
| WO | WO 98/55534 | | 12/1998 |
| WO | WO 00/09610 | | 2/2000 |
| WO | WO 01/19896 | A1 | 3/2001 |
| WO | WO 02/24790 | A2 | 3/2002 |
| WO | WO 03/003198 | A1 | 1/2003 |
| WO | WO 03/082956 | A1 | 10/2003 |
| WO | WO 2004/076530 | A1 | 9/2004 |
| WO | WO 2005/049696 | A1 | 6/2005 |
| WO | WO 2005/050671 | A2 | 6/2005 |
| WO | WO 2005/068542 | A1 | 7/2005 |

OTHER PUBLICATIONS

U.S. Appl. No. 12/600,539, filed Nov. 17, 2009, Schubert, et al.

*Primary Examiner*—Edward J Cain
(74) *Attorney, Agent, or Firm*—Oblon, Spivak, McClelland, Maier & Neustadt, L.L.P.

(57) ABSTRACT

The present invention relates to a process for preparing aqueous formulations (A) comprising at least one polyaromatic compound bearing acid groups, in particular a sulfonated polyaromatic compound, and also aqueous formulations (A) which have been prepared by the process of the invention. Furthermore, the present invention relates to a process for preparing dried formulations (B) by removing the water from the aqueous formulations (A) and also the dried formulations (B) themselves. The present invention further provides a formulation (C) comprising the dried formulation (B) of the invention and water or the formulation A of the invention and a water-comprising formulation (D) comprising the aqueous formulation (A) or the formulation (C) of the invention and additionally at least 2% by weight of an organic solvent. Furthermore, the present invention relates to dry formulations (E) which are obtained by removing water and solvent from the water-comprising formulations (D) of the invention. The present invention further provides for the use of the water-comprising formulations (D) of the invention and of the dry formulations (E) obtained from these for producing a polymer electrolyte membrane and also the polymer electrolyte membrane itself and a membrane-electrode assembly (MEA) and also a fuel cell comprising the polymer electrolyte membrane of the invention.

8 Claims, No Drawings

AQUEOUS FORMULATIONS CONTAINING POLYAROMATIC COMPOUNDS WITH ACID GROUPS

This application is a 371 of PCT/EP2006/063669 filed Jun. 29, 2006.

The present invention relates to a process for preparing aqueous formulations (A) comprising at least one polyaromatic compound bearing acid groups, in particular a sulfonated polyaromatic compound, and also aqueous formulations (A) which have been prepared by the process of the invention. Furthermore, the present invention relates to a process for preparing dried formulations (B) by removing the water from the aqueous formulations (A) and also the dried formulations (B) themselves. The present invention further provides a formulation (C) comprising the dried formulation (B) of the invention and water and a water-comprising formulation (D) comprising the aqueous formulation (A) or the formulation (C) of the invention and additionally at least 2% by weight of an organic solvent. Furthermore, the present invention relates to dry formulations (E) which are obtained by removing water and solvent from the water-comprising formulations (D) of the invention. The present invention further provides for the use of the water-comprising formulations (D) of the invention and of the dry formulations (E) obtained from these for producing a polymer electrolyte membrane and also the polymer electrolyte membrane itself and a membrane-electrode assembly (MEA) and also a fuel cell comprising the polymer electrolyte membrane of the invention.

Functionalized, in particular sulfonated, polyaromatic compounds and their use are known in the prior art. For example, functionalized polyaromatic compounds are used as or in polymer electrolyte membranes in fuel cell technology. Furthermore, sulfonated polyaromatic compounds can be used in electrolytic cells, for example chloralkali cells, and also in or as catalysts for numerous chemical reactions and in processes such as reverse osmosis or ultrafiltration.

Polymer electrolyte membranes which have been produced from the polyaromatic compounds bearing acid groups, in particular sulfonated polyaromatic compounds, are generally produced by dissolving the polyaromatic compounds bearing acid groups in an organic solvent such as DMAc (N,N-dimethylacetamide), DMF (dimethylformamide), DMSO (dimethyl sulfoxide) or NMP (N-methylpyrrolidone) and subsequently carrying out a precipitation or removing the solvent.

A disadvantage is that the solvents mentioned are expensive and have high boiling points, so that their removal is difficult. For reasons of cost reduction, environmental protection and occupational hygiene, it would therefore be desirable for the polyaromatic compounds bearing acid groups to be able to be processed in aqueous solutions. A further reason is that, especially in the field of preparation of noble metal catalyst materials, the use of heteroatom-comprising, in particular chlorine-, sulfur- and nitrogen-comprising, solvents should be avoided or minimized, since these can act as catalyst poisons. For this reason, aqueous formulations of polyaromatic compounds bearing acid groups is of interest for, for example, the production of gas diffusion electrodes for fuel cells or electrolysis units or for producing membrane-electrode assemblies (MEAs) for fuel cells.

A problem in the preparation of aqueous formulations of polyaromatic compounds bearing acid groups is their solubility, in particular when polyaromatic compounds bearing acid groups and having a low or medium number of acid groups are used, since such polyaromatic compounds bearing acid groups are particularly sparingly soluble in aqueous solvents.

WO 98/55534 discloses a process for preparing aqueous, water-comprising and nonaqueous solutions of polymers functionalized with acid groups, in which the heat necessary for preparing the solution is introduced by means of microwave radiation. The solutions serve as starting material for the production of gas diffusion electrodes, fuel cells and platinum nanoparticles stabilized by means of a polymer electrolyte. The polymers functionalized with acid groups are, for example, sulfonated polyether ketones (PEK), polyether ether ketones (PEEK) and polyether ether ketone ketones (PEEKK).

Since irradiation with microwaves is complicated and an appropriate apparatus for irradiation is not available everywhere, it is desirable to provide aqueous and water-comprising formulations comprising polyaromatic compounds bearing acid groups without irradiation with microwaves being necessary. It is desirable here for the aqueous and water-comprising formulations to have a very high solids content (content of polyaromatic compounds bearing acid groups).

This object is achieved by a process for preparing a formulation comprising at least one polyaromatic compound bearing acid groups, which comprises the step (i):

(i) bringing the at least one polyaromatic compound bearing acid groups into contact with water at a temperature of from 120 to 280° C., preferably from 150 to 200° C., particularly preferably from 170 to 200° C., in a closed reactor to give an aqueous formulation A.

Aqueous formulations A of polyaromatic compounds bearing acid groups which have high solids contents can be obtained by means of the process of the invention. The aqueous formulations A are generally solutions or dispersions of at least one polyaromatic compound bearing acid groups.

For the purposes of the present patent application, the expression "water" refers to water, preferably mains water, comprising the amounts of impurities usual for mains water. It is likewise possible to use, for example, partially or fully deionized water. The addition of further components such as salts and emulsifiers is possible, but is not carried out in a preferred embodiment of the process of the invention.

For the purposes of the present patent application, "acid groups" are preferably sulfonic acid groups, phosphoric acid groups, carboxyl groups and/or boric acid groups, with sulfonic acid groups being particularly preferred.

The amount of acid groups in the polyaromatic compounds is generally from 0.5 to 2 mmol of acid groups per g of polyaromatic compound (ion exchange capacity, IEC), preferably from 1 to 1.8 mmol of acid groups per g of polyaromatic compound.

For the purposes of the present patent application, a "polyaromatic compound" is a polymer which has a plurality of arylene groups, preferably a plurality of phenylene groups, within the polymer chain. Suitable "polyaromatic compounds" are for example disclosed in US 2002/0091225, WO 2005/049696, WO 2005/050671, JP2004-345997, US 2004/0149965, EP-A 1 479 714 and EP-A 1 465 277. A "polyaromatic compound" is preferably a compound selected from the group consisting of polyethers, polyhetones, polyaryl ether ketones, polyether ketones, polyaryl sulfones, polyether sulfones, polythiether sulfones, polyphenylene sulfides, polysulfones. More preferably, the "polyaromatic compound" is selected from the group consisting of polyaryl ether ketones, polyaryl sulfones, polyether sulfones, polyphylene sulfides and polysulfones, polyamides, polyether imides, polybenzimidazoles, poloybensothiazoles and polybenzoxazoles. Most preferred are polyaryl ether ketones.

The polyaromatic compounds can bear the acid groups on their aromatic rings or on side chains. Side chains are, for example, aryl, alkyl, alkylaryl, aralkyl, alkenylaryl, arylalkenyl or alkenyl groups which are substituted by the acid groups. The side chains can be bound to any atom of the main polymer chain. They are preferably bound to the aromatic rings of the polyaromatic compounds. Examples of suitable structures are:

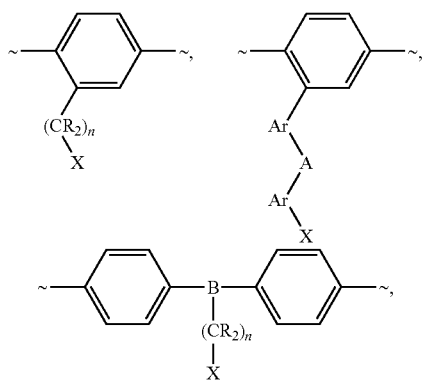

where
X=acid group
A=$CR_2$, NR, S, O,
B=CR, N,
R=substituted or unsubstituted alkyl or substituted or unsubstituted aryl,
n=0 to 10.

The examples are purely illustrative. A person skilled in the art will know that numerous further ways of linking the acid groups to the polyaromatic compounds are possible and these are comprised by the disclosure of the present patent application.

The polyaromatic compounds bearing acid groups are prepared by methods known to those skilled in the art.

The polyaromatic compounds bearing acid groups are particularly preferably sulfonated polyaryl ether ketones.

All known sulfonated polyaryl ether ketones are suitable as sulfonated polyaryl ether ketones. These are generally obtained by sulfonation of the corresponding polyaryl ether ketones. Suitable sulfonation processes are known to those skilled in the art and are disclosed, inter alia, in EP-A 0 008 895, WO 03/03198, DE-A 3402471, DE-A 3321860, EP-A 0 574 791, EP-A 815 159 and WO 2004/076530. The polyaryl ether ketones are commercially available or can be prepared by methods known to those skilled in the art.

The sulfonated polyaryl ether ketones are preferably selected from the group consisting of sulfonated polyether ketones (sPEK), sulfonated polyether ether ketones (sPEEK), sulfonated polyether ketone ketones (sPEKK) and sulfonated polyether ether ketone ketones (sPEEKK).

The degree of sulfonation of the sulfonated polyaryl ether ketones used according to the invention is generally from 10 to 90%, preferably from 20 to 80%, particularly preferably from 30 to 60%, very particularly preferably from 35 to 55%. Suitable methods of preparing sulfonated polyaryl ether ketones having the specified degrees of sulfonation are mentioned in the abovementioned documents.

In the process of the invention, preference is given to preparing formulations which comprise 1 to 5 polyaromatic compounds bearing acid groups, preferably 1 or 2 polyaromatic compounds bearing acid groups, particularly preferably 1 polyaromatic compound bearing acid groups.

Beside the at least one polyaromatic compound bearing acid groups the formulations of the present application may comprise further polymeric compounds, especially non aromatic polymere compounds bearing acid groups for example sulfonated tetrafluoroethylene polymers like Nation®. It is for example possible, that the formulations A are prepared by dissolving the at least one polyaromatic compound bearing acid groups together with the further polymeric compound in step 1).

Step i) Bringing the Polyaromatic Compound Bearing at Least One Acid Group into Contact with Water To prepare aqueous formulations A comprising at least one polyaromatic compound bearing acid groups, the at least one polyaromatic compound bearing acid groups is brought into contact with water according to the process of the invention.

Step i) is carried out at a temperature of from 120 to 280° C., preferably from 150 to 200° C., particularly preferably from 170 to 200° C. If temperatures higher than the temperatures specified are employed, decomposition of the polyaromatic compounds bearing acid groups occurs. In the case of temperatures lower than the specified temperatures, the polyaromatic compounds bearing acid groups do not go into solution or dissolve only slightly.

Step i) is carried out in a closed reactor which is pressure-resistant. Suitable reactors are known to those skilled in the art. For example, step (i) is carried out in an autoclave. Step (i) is thus carried out at a pressure which corresponds to at least the autogenous pressure which results at the specified temperatures.

The process of the invention gives aqueous formulations A in which the at least one polyaromatic compound bearing acid groups comprised is present in unchanged form according to analysis by means of gel permeation chromatography (eluent: DMAc (+LiBr), detector: differential refractometer ERC7515A), i.e. no change in the molecular weight of the polyaromatic compound bearing acid groups has occurred.

The aqueous formulation A obtained in step (i) of the process of the invention has a high content of the at least one polyaromatic compound bearing acid groups. This is generally from 1 to 25% by weight, preferably from 5 to 25% by weight, particularly preferably from 10 to 20% by weight, very particularly preferably from 15 to 20% by weight, with the sum of the at least one polyaromatic compound bearing acid groups and water being 100% by weight. Here, the at least one polyaromatic compound bearing acid groups is present in dissolved or dispersed form in the aqueous formulation A. The process of the invention thus makes it possible to achieve higher solids contents than has hitherto been possible by means of processes of the prior art.

The aqueous formulations of the invention thus generally comprise from 1 to 25% by weight, preferably from 5 to 25% by weight, particularly preferably from 10 to 20% by weight, very particularly preferably from 15 to 20% by weight of at least one polyaromatic compound bearing acid groups and generally from 75 to 99% by weight, preferably from 75 to 95% by weight, particularly preferably from 80 to 90% by weight, very particularly preferably from 80 to 85% by weight, of water, with the sum of the at least one polyaromatic compound bearing acid groups and water being 100% by weight.

The aqueous formulation A of the invention, which generally has a content of polyaromatic compounds bearing acid groups of from 1 to 25% by weight, has a significantly lower viscosity than formulations of sulfonated polyaryl ether ketones comprising the same amount of sulfonated polyaryl ether ketone in organic solvents such as DMSO (dimethyl sulfoxide), DMAc (N,N-dimethylacetamide), DMF (dimethylformamide) or NMP (N-methylpyrrolidone). Furthermore, the aqueous formulations A of the present invention have the advantage over organic formulations that water has a boiling point lower than that of the organic solvents mentioned and is also nontoxic.

The aqueous formulations obtained in step i) can subsequently be treated further in step (ii).

Step ii) Removing the Water

In a further step, viz. step ii), the water can be removed from the formulation A obtained in step i). This gives a dried formulation B.

The removal of the water from the aqueous formulations can be carried out by means of any method known to those skilled in the art. For example, removal of the water can be achieved by application of a vacuum and, if appropriate, slight heating or spray drying.

The dried formulation B obtained in step ii), which comprises at least one polyaromatic compound bearing acid groups, is very readily soluble in water, even at room temperature. This is surprising since the polyaromatic compounds bearing acid groups used in step i) are generally insoluble in water. According to analysis by means of gel permeation chromatography, a change in the molecular weights of the polyaromatic compounds bearing acid groups has not occurred. Without being tied to this theory, a reason for the good water-solubility of the dried formulations B could be altered morphology of the polyaromatic compounds bearing acid groups resulting from the process carried out in step i). This means that the aqueous formulations A comprising at least one polyaromatic compound bearing acid groups which are prepared in step i) of the process of the invention and the dried formulations B comprising at least one polyaromatic compound bearing acid groups which are prepared according to steps i) and ii) differ from aqueous or dried formulations comprising at least one polyaromatic compound bearing acid groups which are known from the prior art.

The present invention therefore further provides an aqueous formulation A prepared by the process of the invention comprising step i). The present invention further provides a dried formulation B prepared by the process of the invention comprising the steps i) and ii). Suitable process conditions and components which are preferably used in the formulations have been mentioned above.

The dried formulations B of the invention can be processed further in various ways.

One possibility is to use the dried formulations of the invention for preparing aqueous formulations which have an even higher solids content of dissolved or dispersed polyaromatic compounds bearing acid groups than the aqueous formulations obtained in step i) of the process of the invention. This is achieved by adding water to the dried formulation B of the invention. Dissolving the dried formulation B of the invention in water makes it possible to obtain aqueous formulations which have a content of the at least one sulfonated polyaryl ether ketone of up to 25% by weight, based on the sum of the dried formulation B and water.

The present invention therefore further provides a formulation C comprising
a) a dried formulation B according to the invention, and
b) water or an aqueous formulation A according to the invention.

The abovementioned formulation C of the invention preferably comprises from 1 to 75% by weight, particularly preferably from 7 to 25% by weight, very particularly preferably from 10 to 20% by weight, of the at least one polyaromatic compound bearing acid groups, based on the sum of the dried formulation B and water or aqueous formulation A.

The at least one polyaromatic compound bearing acid groups can originate from the dried formulation or from the dried formulation B and the aqueous formulation A.

Particular preference is thus given to a formulation C comprising
a) from 1 to 25% by weight, preferably from 5 to 25% by weight, particularly preferably from 10 to 25% by weight, very particularly preferably from 15 to 20% by weight, of a dried formulation B according to the invention, and
b) from 75 to 99% by weight, preferably from 75 to 95% by weight, particularly preferably from 75 to 90% by weight, very particularly preferably from 80 to 85% by weight, of water, with the sum of the dried formulation B and water being 100% by weight.

A further preferred embodiment provides a formulation C comprising
a) from 75 to 99% by weight, preferably from 85 to 90% by weight, of a dried formulation B according to the invention, and
b) from 1 to 25% by weight, preferably from 10 to 15% by weight, of a dried formulation A according to the invention.

Apart from aqueous formulations (formulations A and C) comprising at least one polyaromatic compound bearing acid groups and water, water-comprising formulations which further comprise an organic solvent are of interest. Suitable organic solvents are, for example, NMP (N-methylpyrrolidone), DMAc (N,N-dimethylacetamide), DMF (dimethylformamide), DMSO (dimethyl sulfoxide), alcohols (e.g. methanol, ethanol, propanol, dialcohols such as ethylene glycol, trialcohols such as glycerol) or mixtures thereof. The ratio of water to the organic solvent is generally from 93:2 to 30:70, preferably from 85:5 to 50:50, particularly preferably from 75:5 to 65:20.

The present invention therefore further provides water-comprising formulations D comprising
(a) an aqueous formulation A according to the invention as is obtained by means of a process according to step i) or a formulation C according to the invention as is obtained by adding water or an aqueous formulation A according to the invention to the dried formulation B according to the invention, and
(b) at least 2% by weight, based on the total amount of the formulation, of an organic solvent.

Suitable organic solvents have been mentioned above. The proportion of organic solvent in the water-comprising formulation is generally at least 2% by weight, preferably from 5 to 25% by weight, particularly preferably from 7 to 15% by weight, based on the total amount of the water-comprising formulation.

The water-comprising formulation D of the invention is obtained by adding at least 2% by weight, based on the total amount of the formulation, of an organic solvent to the aqueous formulation A of the invention as is obtained in step i) of the process of the invention or to the formulation C of the invention comprising the dried formulation B of the invention and water or the aqueous formulation A of the invention. Suitable organic solvents and suitable amounts of solvents have been mentioned above.

The polyaromatic compound bearing acid groups is present in solution or in the form of a dispersion in the water-comprising formulations D of the invention.

The water-comprising formulations D of the invention cannot be prepared by dissolving polyaromatic compounds bearing acid groups in a mixture of water and solvent because of the water-insolubility of the polyaromatic compounds bearing acid groups.

It has surprisingly been found that drying a water-comprising formulation D according to the invention having a content of organic solvents of >2% by weight gives a water-insoluble residue. The advantage of such a water-insoluble residue is that water-insoluble membranes comprising polyaromatic compounds bearing acid groups can be produced on the basis of the water-comprising formulations D of the invention. Such membranes are suitable, for example, for application in fuel cells and electrolysis cells. In production of a membrane from the water-comprising formulations D of the invention, more rapid drying can be carried out at low temperatures since the boiling point of water is significantly lower than the boiling point of the organic solvents which are used according to the prior art in the production of membranes from polyaromatic compounds bearing acid groups. Furthermore, the residual content of the organic solvent in the membranes can be set in a controlled manner when the membranes are produced from water-comprising formulations according to the invention. The water-comprising formulations of the invention also have a low viscosity, which aids filtration in production of the membrane. Furthermore, higher solids contents can be achieved when using the water-comprising formulations D of the invention.

The present invention therefore further provides a process for preparing a dry formulation E comprising at least one polyaromatic compound bearing acid groups by drying the water-comprising formulation D according to the invention.

Suitable drying methods are known to those skilled in the art; for example, drying can be achieved by applying a vacuum at, if appropriate, elevated temperatures or by spray drying.

The present invention further provides a dry formulation E prepared by the abovementioned process of the invention. As mentioned above, the dry formulation E prepared from a water-comprising formulation D having a solvent content of at least 2% has the advantage that it is water-insoluble and can thus be used for producing membranes for fuel cells and electrolysis cells. Advantages in the production of membranes from the water-comprising formulation D have been mentioned above.

Water-insoluble membranes can thus be produced from the water-comprising formulation D.

The dry formulation E can additionally comprise at least one further polymer and/or further inorganic and/or organic compounds which may be solid or liquid. These can be added before or after drying of the water-comprising formulation D. Here, mixing of the dry formulation E with the further polymer and/or the inorganic and/or organic compounds is conceivable. It is likewise conceivable for the further polymers to be deposited in the form of a film on a membrane which has been produced from the water-comprising formulation D.

Suitable further polymers are, for example, thermoplastic polymers, preferably polyether sulfones and polysulfones.

The present invention therefore further provides dry formulations E which additionally comprise at least one further polymer, preferably at least one polyether sulfone and/or polysulfone, particularly preferably at least one polyether sulfone, and, if appropriate, further inorganic and/or organic compounds.

The weight ratio of the at least one polyaryl ether ketone of the dry formulation and the at least one further polymer is generally from 1:99 to 99:1, preferably from 2:1 to 20:1.

Inorganic and/or organic compounds suitable as further constituents are generally low molecular weight solids or polymeric solids which can, for example, be able to take up or release protons.

Among these compounds which are able to take up or release protons, the following examples may be mentioned:

sheet silicates such as bentonites, montmorillonites, serpentine, kalinite, talc, pyrophyllite, mica. Further details may be found in Hollemann-Wiberg, Lehrbuch der Anorganischen Chemie, 91st-100th edition, p. 771 ff (2001).

Aluminosilicates such as zeolites.

Water-insoluble organic carboxylic acids, for example ones which have from 5 to 30, preferably from 8 to 22, particularly preferably from 12 to 18, carbon atoms and a linear or branched alkyl radical and may, if appropriate, bear one or more further functional groups such as, in particular, hydroxyl groups, C—C double bonds or carbonyl groups. Examples which may be mentioned are the following carboxylic acids: valeric acid, isovaleric acid, 2-methylbutyric acid, pivalic acid, caproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nondecanoic acid, arachic acid, behenic acid, lignoceric acid, cerotinic acid, melissic acid, tubercolostearic acid, palmitoleic acid, oleic acid, erucic acid, sorbic acid, linoleic acid, linolenic acid, eleostearic acid, arachidonic acid, culpanodonic acid and docosahexanoic acid and mixtures of two or more thereof.

Polyphosphoric acids as are described, for example, in Hollemann-Wiberg, loc. cit., p. 659 ff.

Mixtures of two or more of the abovementioned solids.

A further, preferably unfunctionalized, polymer can likewise be added. For the purposes of the present invention, an "unfunctionalized polymer" is a polymer which is neither a perfluorinated and sulfonated (ionomeric) polymer such as Nafion® or Flemion® nor a polymer which is functionalized by suitable groups to achieve sufficient proton conductivity, for example —$SO_3H$ groups or —COOH groups. Unfunctionalized polymers which can be used for this purpose according to the present invention are subject to no particular restrictions as long as they are stable in the fields of application in which the polymer systems of the invention are to be used. If, in a preferred use, they are used in fuel cells, use should be made of polymers which are thermally stable up to 100° C. and preferably up to 200° C. or higher and have a very high chemical stability. Preference is given to using:

polymers having an aromatic backbone, for example polyimides, polysulfones, polyether sulfones such as Ultrason®, polybenzimidazoles.

Polymers having a fluorinated backbone, for example Teflon® or PVDF.

Thermoplastic polymers or copolymers, for example polycarbonates such as polyethylene carbonate, polypropylene carbonate, polybutadiene carbonate or polyvinylidene carbonate or polyurethanes as are described, inter alia, in WO 98/44576.

Crosslinked polyvinyl alcohols.

Vinyl polymers such as
polymers and copolymers of styrene or methylstyrene, vinyl chloride, acrylonitrile, methacrylonitrile, N-methylpyrrolidone, N-vinylimidazole, vinyl acetate, vinylidene fluoride.

Copolymers of vinyl chloride and vinylidene chloride, vinyl chloride and acrylonitrile, vinylidene fluoride and hexafluoropropylene.

Terpolymers of vinylidene fluoride and hexafluoropropylene and also a compound from the group consisting of vinyl fluoride, tetrafluoroethylene and trifluoroethylene.

Such polymers are disclosed, for example, in U.S. Pat. No. 5,540,741, whose relevant disclosure is fully incorporated by reference into the present patent application.

Phenol-formaldehyde resins, polytrifluorostyrene, poly-2,6-diphenyl-1,4-phenylene oxide, polyaryl ether sulfones, polyarylene ether sulfones, phosphonated poly-2,6-dimethyl-1,4-phenylene oxide.

Homopolymers, block polymers and copolymers prepared from:

olefinic hydrocarbons such as ethylene, propylene, butylene, isobutene, propene, hexene or higher homologues, butadiene, cyclopentene, cyclohexene, norbornene, vinylcyclohexane.

Acrylic esters or methacrylic esters such as methyl, ethyl, propyl, isopropyl, butyl, isobutyl, hexyl, octyl, decyl, dodecyl, 2-ethylhexyl, cyclohexyl, benzyl, trifluoromethyl, hexafluoropropyl or tetrafluoropropyl acrylate or methacrylate.

Vinyl ethers such as methyl, ethyl, propyl, isopropyl, butyl, isobutyl, hexyl, octyl, decyl, dodecyl, 2-ethylhexyl, cyclohexyl, benzyl, trifluoromethyl, hexafluoropropyl or tetrafluoropropyl vinyl ether.

All these unfunctionalized polymers can in principle be used in crosslinked or uncrosslinked form.

The formulations of the invention are suitable for numerous applications known to those skilled in the art. An important aspect is that the process of the invention makes it possible to obtain formulations which can be used as ion-exchanging polymer systems, for example in fuel cells, for example as ionomer or polymer electrolyte membrane, for example in membrane-electrode assemblies (MEAs).

The present invention therefore further provides for the use of a dry formulation E according to the invention as ionomer or polymer electrolyte membrane and also ionomers or polymer electrolyte membranes produced from the dry formulation E of the invention or the water-comprising formulation D of the invention. It is likewise possible to use the formulations A, B, C and D of the invention for producing ionomer formulations or polymer electrolyte membranes, if appropriate after further treatment of the formulations.

The production of the polymer electrolyte membrane of the invention can in principle be carried out by all suitable methods known to those skilled in the art. The polymer electrolyte membrane of the invention is preferably produced by preparing a casting solution or casting dispersion comprising at least one polyaromatic compound bearing acid groups. In the case of the casting solution, this can be the water-comprising formulation D according to the invention or the dry formulation E according to the invention dissolved in at least one of the abovementioned solvents. The casting solution or casting dispersion is applied to a suitable support, for example by spreading the casting solution or dispersion by means of a doctor blade. Suitable supports are, for example, glass plates or PET films. It is also possible to apply the casting solution or casting dispersion, if appropriate, should this be necessary, to a support material, by, for example, dipping, spin coating, roller coating, spray coating, printing and letterpress, gravure, flatbed or screen printing processes or else by extrusion. Further processing can be carried out in a customary way, for example by removing the solvent or the mixture of water with a suitable solvent by drying at room temperature or elevated temperature, if appropriate under reduced pressure. It is likewise possible to produce polymer electrolyte membranes by evaporating the solvent or mixture of solvent and water to a solids concentration of from 50 to 99% by weight by methods known to those skilled in the art and subsequently precipitating the membrane by methods known to those skilled in the art using a precipitant which is miscible with the solvent and water adhering to the membrane. The membrane is subsequently freed of the solvent or the mixture of solvent and water in a manner known to those skilled in the art. Processes for producing electrolyte membranes are known to those skilled in the art and are disclosed, for example, in EP-A 0 574 791, DE-A 42 11 266 and DE-A 34 02 471.

Preference is given to producing polymer electrolyte membranes which have a thickness of from 5 to 500 µm, preferably from 10 to 500 µm and particularly preferably from 10 to 200 µm (thickness of the dry polymer electrolyte membrane).

The present invention further provides a composite comprising at least a first layer comprising at least one polyaromatic compound bearing acid groups in the form of a dry formulation E according to the invention, and also such a composite which comprises at least a first layer comprising at least one polyaromatic compound bearing acid groups in the form of a dry formulation according to the invention in the form of a membrane and further comprises at least one electrically conductive catalyst layer (catalyst-coated membrane, CCM). Suitable CCMs comprise a catalyst layer, e.g. a catalyst layer composed of a polymer, preferably a dry formulation E, carbon black and a catalyst, preferably a noble metal catalyst or a catalyst layer, which is produced by application of what is known as catalyst ink to a membrane. Suitable catalyst inks comprise, for example, agglomerates of catalytically active noble metals, (e.g. catalytic platinum or ruthenium agglomerates) and at least one solvent. Suitable solvents are water, alcohols (monohydric or polyhydric alcohols, e.g. alcohols having one, two or three OH groups), DMAc (N,N-dimethylacetamide), DMF (dimethylformamide), DMSO (dimethyl sulfoxide) or NMP (N-methylpyrrolidone). Preferred catalyst inks are the aqueous catalyst formulations mentioned below. The catalyst inks can be applied to the membrane by, for example, spraying, doctor blade coating or printing or further methods known to those skilled in the art.

In addition to the membrane and the catalyst layer or layers, the composite can further comprise one or more gas diffusion layers (GDLs), e.g. a carbon nonwoven. The catalyst layer(s) is (are) located on the gas diffusion layer(s), giving a membrane-electrode assembly (MEA).

Suitable membrane-electrode assemblies and catalyst-coated membranes and their production are known to those skilled in the art.

A suitable MEA is produced, for example, by applying a catalyst ink to a GDL to give a coated GDL. Two coated GDLs are subsequently processed together with a polymer electrolyte membrane arranged between the GDLs to form an MEA, e.g. by means of hot pressing. Preferred catalyst inks and polymer electrolyte membranes are the catalyst inks and polymer electrolyte membranes according to the invention. Suitable processes for producing the MEA are known to those skilled in the art.

This composite can further comprise one or more bipolar electrodes.

The present invention further provides a fuel cell comprising at least one polymer electrolyte membrane according to the invention or a composite according to the invention.

Preferred aromatic compounds bearing acid groups have been mentioned above. Furthermore, the aqueous and water-comprising formulations of the invention can, according to the present invention, be used for preparing catalyst formulations (polymer electrolyte+carbon black+noble metal catalyst, water and, if appropriate, solvent, preferably a water-miscible solvent) and for applying polyaromatic compounds bearing acid groups to membranes and gas diffusion electrodes. An advantage of the formulations of the invention is that, owing to their altered polymer morphology, they make a higher utilization of the noble metal catalyst possible. This makes it possible for the catalyst to comprise less noble metal than in the prior art and the production of the noble metal catalysts is thus less expensive. Furthermore, use of the water-comprising formulations of the present invention enables the partial dissolution of the membrane to achieve better contact between the membrane and the catalyst layer to be controlled in a targeted manner. Furthermore, the abovementioned aqueous or water-comprising catalyst formulations (catalyst inks) are relatively nonflammable, which makes handling of the pyrophoric catalyst easier. In the state of the art, for example EP-A 1 503 439, it is necessary to employ high boiling solvents and/or dispersants to obtain an uniform dispersion of the particles in the catalyst ink. The use of dispersants is not necessary in the preparation of the catalyst inks of the present invention. Further, it is possible to avoid or at least to reduce the amount of high boiling solvents in the catalyst inks of the present invention.

The following examples illustrate the invention.

EXAMPLE 1

20 g of sPEEK (degree of sulfonation=40%) are admixed with 80 g of water and treated at 180° C. in an autoclave for 20 minutes. Solid present is separated off from the solution by centrifugation. The yield is 65.4g of the sPEEK-comprising aqueous solution. The degree of sulfonation of the soluble material is 40% by weight and the solution has a solids content of 18.1% by weight.

EXAMPLE 2

17.5 g of sPEEK (degree of sulfonation=55%) are admixed with 82.5 g of water and treated at 180° C. in an autoclave for 20 minutes. Solid present is separated off from the solution by centrifugation. The yield is 65 g of the sPEEK-comprising aqueous solution. The degree of sulfonation of the soluble material is 55% and the solution has a solids content of 18% by weight.

The invention claimed is:

1. A process for preparing a formulation comprising at least one polyaromatic compound bearing acid groups, which comprises:
    (i) bringing said at least one polyaromatic compound bearing acid groups into contact with water at a temperature of from 170 to 280° C., in a closed reactor to give an aqueous formulation A.

2. The process according to claim 1, wherein the polyaromatic compound bearing acid groups is selected from polyaryl ether ketones, polyaryl sulfones, polyether sulfones, polyphenyl sulfides and polysulfones bearing sulfonic acid groups, phosphoric acid groups, carboxyl groups and boric acid groups.

3. The process according to claim 1, wherein the amount of acid groups in the polyaromatic compounds is from 0.5 to 2 mmol of acid groups per g of polyaromatic compound.

4. The process according to claim 1 which additionally comprises:
    (ii) removing the water from said aqueous formulation A obtained in i) to give a dried formulation B.

5. A water-comprising formulation D comprising
    a) an aqueous formulation A prepared by bringing at least one polyaromatic compound bearing acid groups into contact with water at a temperature of from 170 to 280° C., in a closed reactor, and
    b) at least 2% by weight, based on the total amount of the formulation, of an organic solvent.

6. The water-comprising formulation D according to claim 5, wherein the organic solvent is selected from the group consisting of N-methylpyrrolidone, N,N-dimethylacetamide, dimethylformamide, dimethyl sulfoxide and mixtures thereof.

7. A dry formulation E comprising at least one polyaromatic compound bearing acid groups prepared by drying the water-comprising formulation D according to claim 5, said dry formulation E additionally comprising at least one further polymer.

8. A polymer electrolyte membrane produced from a water-comprising formulation according to claim 5.

* * * * *